(12) United States Patent
Schultheis et al.

(10) Patent No.: US 7,194,158 B2
(45) Date of Patent: Mar. 20, 2007

(54) METHOD FOR PRODUCING LIGHT-SCATTERING STRUCTURES ON FLAT OPTICAL WAVEGUIDES

(75) Inventors: Bernd Schultheis, Schwabenheim (DE); Harry Engelmann, Ingelheim (DE); Clemens Ottermann, Hattersheim (DE)

(73) Assignee: Schott AG, Mainz (DE)

( * ) Notice: Subject to any disclaimer, the term of this patent is extended or adjusted under 35 U.S.C. 154(b) by 178 days.

(21) Appl. No.: 10/914,628

(22) Filed: Aug. 9, 2004

(65) Prior Publication Data

US 2005/0069254 A1 Mar. 31, 2005

(30) Foreign Application Priority Data

Aug. 8, 2003 (DE) .................... 103 36 352

(51) Int. Cl.
G02B 6/12 (2006.01)
G02B 6/42 (2006.01)
G02B 6/26 (2006.01)
G02B 6/34 (2006.01)
G02B 6/10 (2006.01)

(52) U.S. Cl. ................ 385/31; 385/14; 385/15; 385/37; 385/39; 385/42; 385/129; 385/130; 385/131; 385/132

(58) Field of Classification Search ........... 385/14, 385/15, 31, 37, 39, 42, 129–132
See application file for complete search history.

(56) References Cited

U.S. PATENT DOCUMENTS 5,113,470 A * 5/1992 Fukushima et al. ......... 385/126
5,825,789 A * 10/1998 Watanabe et al. ............. 372/21
2002/0187272 A1* 12/2002 Kojima et al. ............... 427/421

* cited by examiner

Primary Examiner—Brian Healy
Assistant Examiner—Jerry Martin Blevins
(74) Attorney, Agent, or Firm—Pauley Petersen & Erickson

(57) ABSTRACT

A method for producing light-scattering structures on flat optical waveguides into which light can be coupled for making the light-scattering structures visible. The light-scattering structures are applied to a surface of the optical waveguide in accordance with a predetermined arrangement prescription. The light-scattering structures are applied directly to the optical waveguide with a non-impact method. The application of the light-scattering structures can occur by imprinting with a computer-controlled, contactless-operating print head or by electro-photographic coating.

32 Claims, 4 Drawing Sheets

METHOD FOR PRODUCING LIGHT-SCATTERING STRUCTURES ON FLAT OPTICAL WAVEGUIDES

BACKGROUND OF THE INVENTION

1. Field of the Invention

This invention relates to a method for producing light-scattering structures on flat optical waveguides, into which light can be coupled for making the light-scattering structures visible, wherein the light-scattering structures are applied to a surface of the optical waveguide in accordance with a predetermined arrangement prescription.

2. Discussion of Related Art

It is known to employ "free-floating" letters and representations for advertising purposes or as indicating signs. Such light-scattering structures permit individual designer solutions for illuminated monochromatic or colored indicating means.

It is known to engrave or etch symbols or letters into plates made of glass or transparent plastic. Such structures can also be applied in the plate interior with laser techniques. The structures become visible, or are excited to glow, by illuminating the plates by coupling light in via the plate edges. Customarily incandescent lights, fluorescent tubes, cold-cathode tubes (CCFL), fiber optical waveguides, light-emitting diode arrangements (LEDs), organic light-emitting diodes (OLEDs) or devices generating electro-luminescence (EL) are used for coupling in the light.

The screen-printing process is used in large numbers, particularly for back-lighting liquid-crystal indicators and LCD screens, for example. In such screens which, for example, are used in connection with portable computers or laptops, light is coupled from the side into a flat optical waveguide and is coupled out in the direction toward the indicator at scattering centers attached to the back. In this case the distribution of the scattering centers is selected so that as uniform as possible a light distribution is generated. Fewer scattering centers are arranged in that edge area of the indicator in which the light is coupled, while the density of the scattering centers is increased toward the center of the screen or of the optical waveguide. For achieving uniform coupling-out of the light, the structures applied are very complex and can only be produced by "standard methods", such as by screen-printing. The scattering centers are moreover arranged in a grid system of points. So that this structure does not appear to the viewer in the form of individual points of light, in accordance with the prior art a diffuser, which is in the form of a scattering disk made of plastic, is arranged between the optical waveguide and the LCD indicator.

The known etching and lithographic methods are highly cost-intensive, particularly when structuring large surfaces, because it is necessary to use expensive photosensitive resists in large coating and exposure installations. Such methods are also very time-consuming, because they are subject to long processing times.

When producing identical light-scattering structures in large numbers, the use of printing and foil methods can be useful from a cost viewpoint. However, the production of individual masks or punching tools by elaborate pre-preparation is only practical in connection with large numbers of pieces. With complex structurizing patterns in particular which, for example, have fine lines or free separate structures, such as the interiors of closed rings, the manufacture of the tools is very critical in its handling, particularly with foil transfer to the surface of the components. Here the achievable minimum resolution and the "dynamics" during simultaneous printing are much wider and greatly limited during simultaneous printing of very wide and very fine structures. Also, a desired local variation of the compactness of the scattered light by different light-scattering structures or grid structures is difficult to realize.

Laser-supported methods for creating light-scattering structures, such as known interior etching by laser, wherein a structure is formed in the interior of a glass plate by lasers, are also expensive and have time-consuming applications.

In general, with methods known in the prior art it is only possible with a large outlay, if at all, to produce multi-colored and/or intensity-staggered representations or gray tints such as required with images or photographs, for example.

SUMMARY OF THE INVENTION

It is one object of this invention to provide a method for producing light-scattering structures on flat optical waveguides, by which arbitrarily structured representations can be produced with low processing times and high throughput.

The above object and others are achieved with this invention as described in this specification and in the claims.

In accordance with this invention, the light-scattering structures are applied directly to the optical waveguides by a non-impact method. No elaborate preparation of masks or provision of tools is required. Throughput is substantially increased in comparison with known methods because the coating method in accordance with this invention is not elaborate and is easy to work. Also, the method permits the design of any arbitrary patterns.

In accordance with this invention, it is possible to apply a fluid coating material, which sets after its application. Such a material can be simply processed, particularly in ink jet devices, wherein a lacquer, which can be hardened, a thermoplastic or thermosetting plastic material, or a glass paste can be used. The application of the light-scattering structures can be easily realized by imprinting with the aid of a computer-controlled contactless print head.

In accordance with one embodiment of this invention, a toner, which is fixed after its application, can be used as the coating material. A glass paste, glass paste particles, a thermoplastic or thermosetting polymer, or a similar plastic material, can be selected as the toner. Such a toner can be easily processed in electro-photographic printing devices. During this the application of the light-scattering structures can include the application of a layer by electro-photographic coating. It can be necessary to apply a conductive electrode layer on the optical waveguide material for electro-photographic coating.

The coating material should be transparent or colored in the hardened or fixed state and have a refractive index which is approximately identical to the refractive index of the optical waveguide. It is thus possible to realize the easy coupling-out from the optical waveguide.

Glass, for example soda-lime glass or Optiwhite glass, glass without green coloration, or transparent plastic, for example polymethylmethacrylate (PMMA) or polycarbonate, for example Lexan® made by GE Plastics, can be selected for the substrate of the optical waveguide. These materials make particularly good optical waveguides.

For creating colored or white scattered light it is possible to add colorless or colored light-scattering centers to the coating material, whose refractive index is different from the refractive index of the hardened, or fixed coating material.

Color pigments, or similar colored or colorless scattering particles made of a glass or plastic material, can be selected for the light-scattering centers. Thus it is possible to form a matrix for receiving the light-scattering centers from the hardened, or fixed coating material.

It is possible to select a material which has the light-scattering centers for the toner or the fluid coating material. Thus it is possible to apply the light-scattering centers in a separate coating step.

It is possible to arrange a predetermined number of light-scattering centers per unit of surface to get a defined density of the light-scattering centers, by which the color intensity or the outcoupling of the scattered light, for example, is affected. Thus the light-scattering centers are distributed on the optical waveguide in accordance with a predetermined density distribution.

While applying the light-scattering structures it is possible to apply a conductive electrode layer to the optical waveguide substrate. Alternatively, the optical waveguide substrate can already have the conductive electrode layer. In this case, the conductive electrode layer can be a tin oxide layer, an indium-doped tin oxide layer (ITO), or a similar conductive layer.

The application of the coating material can occur in one method step, and the application of the light-scattering centers in a subsequent method step. With this it is possible to vary the distribution of the light-scattering centers. For this purpose, the application of the light-scattering centers can occur computer-controlled in accordance with a predetermined distribution. It is thus possible to achieve an even coupling-out of the light, particularly in connection with differently shaped optical waveguides.

BRIEF DESCRIPTION OF THE DRAWINGS

This invention is explained in greater detail in view of preferred embodiments, making reference to the drawings, wherein.

DESCRIPTION OF PREFERRED EMBODIMENTS

Figure 1:
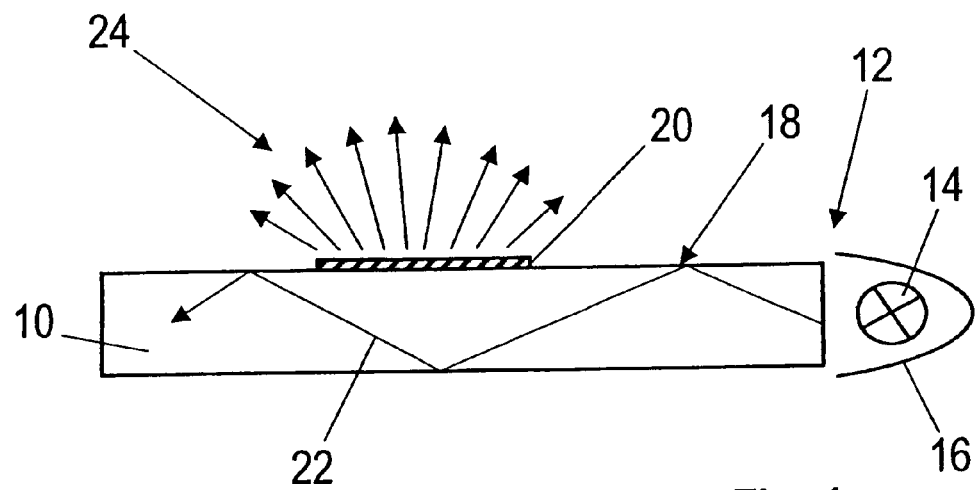
FIG. 1 shows a flat optical waveguide in a schematic plan view, in section, showing a right edge area where the light from a lamp is coupled in and to whose top surface a light-scattering structure is applied, wherein the light is coupled out upwards.

A plate 10 made of glass or a transparent plastic material is shown in a schematic plan view and in section in FIG. 1, having a right edge area 12 in which the light from a lamp 14 is coupled. A mirror device 16 is arranged at the lamp 14, which focuses the light from the lamp 14 to the edge area 12 and shades the space facing away from the optical waveguide 10. A light-scattering structure 20 is attached to the upper outer surface 18 of the plate 10, wherein the light is coupled out toward the top. The coupled-in light 22 is conducted inside the plate 10 by total reflection. The light is coupled out of the plate 10 acting as an optical waveguide in the form of scattered light 24 at the light-scattering structure 20.

Figure 2:
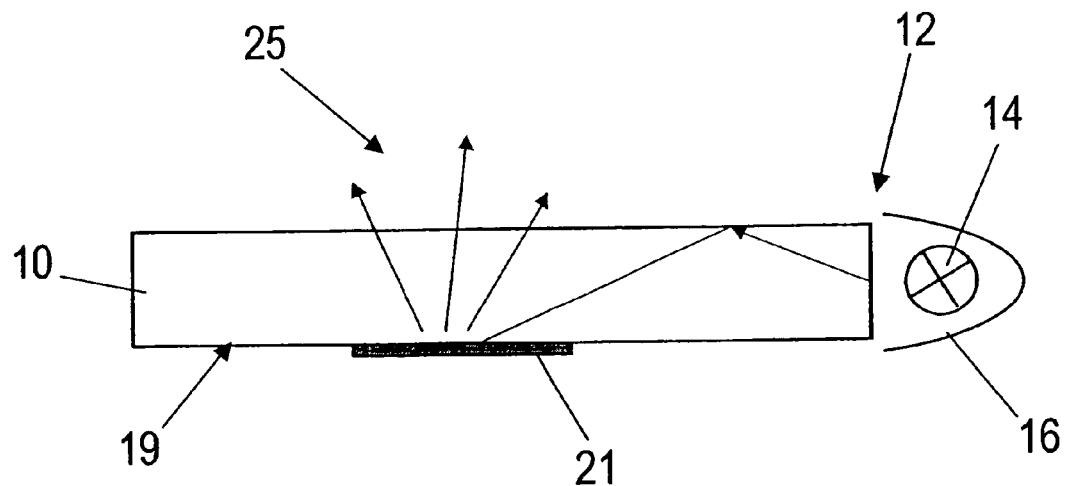
FIG. 2 shows a flat optical waveguide in a schematic plan view, in section, showing a right edge area where the light from a lamp is coupled in and to whose bottom surface a light-scattering structure is applied, wherein the light is coupled out upwards through the optical waveguide.

FIG. 2 shows a similar arrangement where one difference from the arrangement shown in FIG. 1 is that a light-scattering structure 21 is attached to the lower outside surface 19 of the plate 10. In this case, the light is coupled out upward from the plate 10 acting as an optical waveguide through the plate 10 in the form of scattered light 25 at the light-scattering structure 21.

Figure 3:
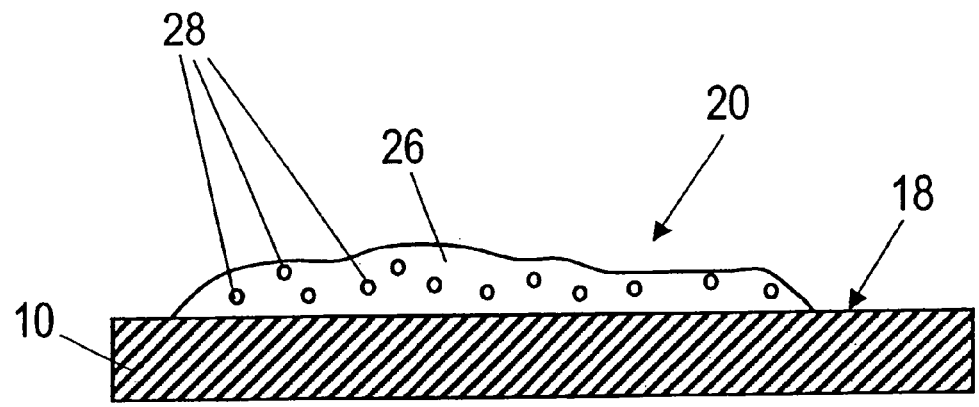
FIG. 3 shows a flat optical waveguide in a schematic plan view, in section, on which surface a light-scattering structure formed by a matrix and scattering particles is applied.

FIG. 3 shows a plate 10 of glass in a schematic plan view, in section, to whose upper surface 18 a light-scattering structure 20 made of a matrix 26 of glass paste and a plurality of colorless or colored scattering particles 28 is applied. The scattering particles are formed by pigments embedded in the glass paste matrix 26. The glass paste matrix 26 has substantially the same refractive index as the material of the plate 10, while the refractive index of the scattering particles 28 differs from the refractive index of the matrix 26. Thus, as shown by FIG. 1, the light 22 conducted by total reflection in the plate 10 can enter the matrix 26 at the light-scattering structure 20 and is scattered at the scattering particles 28 and, depending on the type of scattering particles 28, is coupled-out as monochromatic or colored scattered light 24.

In another embodiment, the light-scattering structure 20 represented in FIG. 3 can also be of a transparent, thermoplastic or thermosetting plastic material. It is also possible to use lacquer layers, which are embodied to be UV-hardening, for a light-scattering structure.

As shown in FIG. 3, a simple construction of a light-scattering structure 20 can be created because the light-scattering structure 20 is applied as a transparent layer, in which microscopic particles are contained as scattering particles 28. Here, the different materials for the matrix 26 and the scattering particles 28 are mixed together prior to being applied. Depending on the number of introduced particles 28, it is possible to obtain a differently strong scattering effect. However, if the number of the scattering particles 28 is constant over the surface of the optical waveguide, or plate 10, the amount of coupled-out light decreases with an increasing distance from the lamp. This can be disadvantageous for certain applications, because the light distribution is inhomogeneous.

Figure 4:
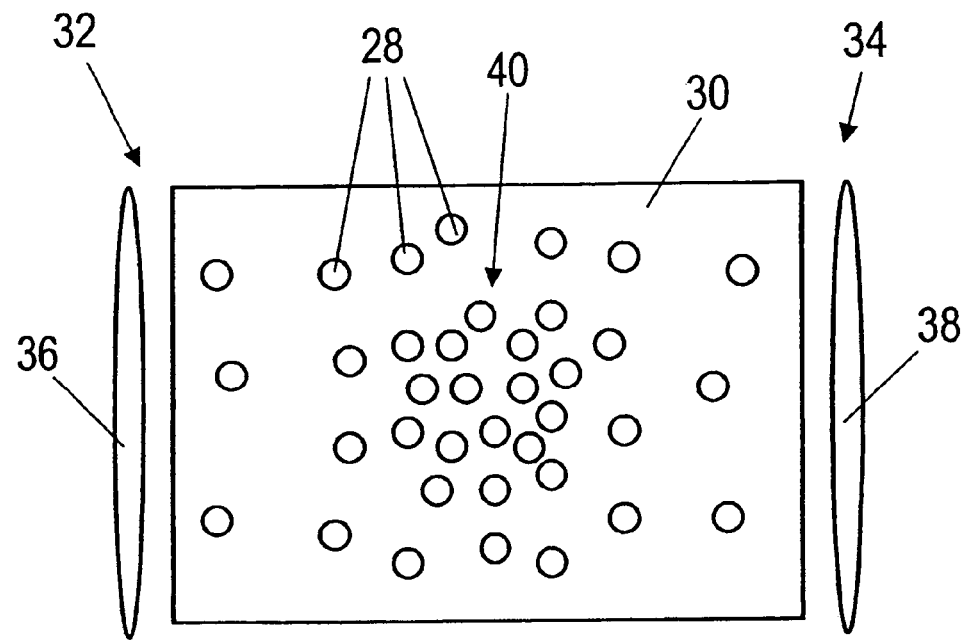
FIG. 4 shows a plate-shaped optical waveguide in a schematic view from the top, into which light is coupled at two edge areas, wherein the density of the scattering particles is greater in the center area of the optical waveguide plate than in the edge area.

A homogeneous light distribution can be achieved because the density of the scattering particles 28 is varied as a function of their distance from the coupled-in light source. In a schematic view from above, FIG. 4 shows a plate-shaped optical waveguide 30, for example an LCD screen, into which light from respective light sources 36 and 38 is coupled in at the two edge areas 32 and 34. In the center area 40 of the optical waveguide plate 30 the density of the scattering particles 28 is greater than in the edge areas 32 or 34. This allows a uniform coupling in of light over the entire optical waveguide plate 30.

The variable arrangement of the scattering particles 28 at the optical waveguide plate 30 is achieved because in a first step a transparent material, not shown, for example a thermoplastic material, is applied as a light-scattering structure which does not contain scattering particles. The transparent material is used to couple out the light conducted by total reflection in the optical waveguide plate 30. For this purpose, the transparent material has approximately the same refractive index as the optical waveguide plate 30. In a further step, the scattering particles 28 are applied, computer controlled, to the light-scattering structures in accordance with a previously calculated density distribution, by which a homogeneous outcoupling of the light with the desired color effects can be realized.

For large surface applications and with a small number of pieces, or as a single piece, wherein the requirements for accuracy can lie within a range of some 10 µm, such as is the case, for example, with large-surfaces illuminated signs, the light-scattering structures 20 or 21 can be easily applied, cost-effectively. Thus, the light-scattering structures 20 or 21 are applied directly, without additional masking techniques or tool preparation, to a surface 18 or 19 of a transparent plate 10 used as an optical waveguide and are fixed as described in view of FIGS. 1 and 2.

Short processing times for high throughput and a large degree of flexibility in the design of the light-scattering structures are realized by a so-called non-impact method, wherein the material for forming the light-scattering structures is applied without mechanical effects of, for example, a print head, is directly applied to a substrate, or an optical waveguide plate.

In accordance with this invention, a so-called computer-to-glass (CTG) method is used for producing the above-described light-scattering structures on glass surfaces.

Figure 5:
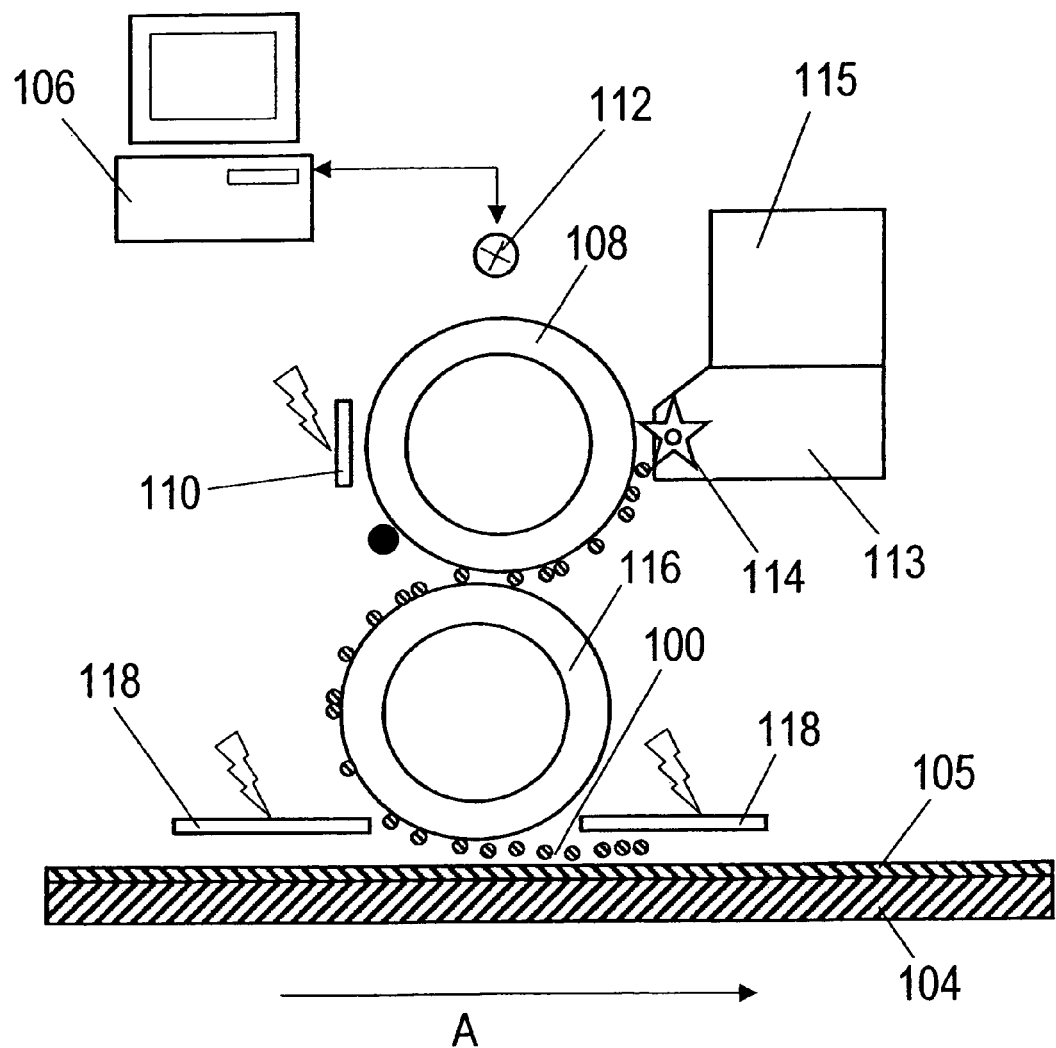
FIG. 5 shows an electro-photographically operated device in a schematic plan view and in section for applying light-scattering structures to the surface of flat optical waveguides.

In a schematic plan view, in section, FIG. 5 shows one embodiment of a device for applying light-scattering structures 100 to the surface 102 of a glass plate 104 in accordance with the computer-to-glass (CTG) method. In a first step, not shown, the surface of the glass plate 104 can have a conductive electrode layer 105 as the preparation for the CTG method. However, this method step can also be omitted, particularly if the glass plate 104 already has a conductive electrode layer 105, for example made of tin oxide.

The embodiment represented in FIG. 5 is especially used for the electro-photographic transfer of light-scattering structures 100 to the glass plate 104. The functioning of such a device corresponds in principle to that of a laser printer or copier.

A photoconductor drum 108 rotates, and its surface is passed along a charged corona device 110 so that the latter yields its charge to the photoconductor drum 108, and the surface of the photoconductor drum 108 is evenly charged. With its rotation, the charged surface of the photoconductor drum 108 is then moved beyond a light-emitting diode arrangement 112 which is then controlled by a computer arrangement 106, so that the photoconductor drum 108 is exposed corresponding to the design to be transferred to the surface of the glass substrate 104. The charge on the surface is conducted away at the exposed places, so that the photoconductor drum 108 receives an invisible electrical image of the pattern.

It is also possible to use a pattern which is transferred to the glass substrate 104 in accordance with the xerographic method, such as in the manner of a copier. An arrangement of an illuminating lamp, a lens and several deflection mirrors is used for this purpose, in place of the light-emitting diode arrangement 112 represented in FIG. 5. The pattern is projected onto the photoconductor drum 108 by this arrangement.

Alternatively, light-emitting diode arrays or an arrangement of oscillating mirror arrays can be employed. In a still further embodiment, the light-emitting diode arrangement 112 can be replaced by a rotating polygonal mirror, to which a laser source is assigned and which projects the laser light line-by-line on the surface of the photoconductor drum 108.

Then toner from a toner container 113 is transferred to the photoconductor drum 108 by a magnetic brush 114 of a developer unit 115. In addition, a bias voltage is applied between the photoconductor drum 108 and the developer unit 115. The toner now adheres only to the areas of the photoconductor drum 108 which have been discharged by the exposure. However, different from a laser printer, the toner is not directly transferred from the photoconductor drum 108 onto the glass substrate 104. Because the glass substrate 104 is of a comparatively hard material, the toner is instead first transferred from the photoconductor drum 108 to a transfer drum 116, and only then to the glass substrate 104. The transfer drum 116 has a soft surface, for example made of rubber, which can easily adapt itself to the surface of the glass substrate 104, so that a good contact between the glass substrate 104 and the toner on the transfer drum 116 is achieved.

The glass substrate 104, which is conducted in the direction of the arrow A at a throughput rate of 1 to 10 m/min, is also evenly charged by a transfer corona device 118, so that the toner is pulled off the transfer drum 116. In place of a charge by a transfer corona device 118, a uniform charge can also be achieved by direct electrical contact with a voltage source because the surface of the glass substrate is sufficiently conductive due to the previous coating with the conductive electrode layer 105, and the charge is evenly distributed. In a subsequent fixation process the surface coated with the toner is heated to a moderate temperature below 250° C. and the toner is hardened.

This process of the application of a resistive layer with at least one structure is advantageous because the coating can be performed comparatively fast.

A transparent ceramic toner with glass paste particles can be used particularly when coating a glass substrate 104. In addition, it is also possible to embed in or mix with this toner scattering centers made of glass paste particles with a satisfactory refractive index. Following its application, such a toner is burned in at temperatures of more than 600° C.

A lateral resolution of the structure of approximately 20 µm can be achieved with such an electro-photographic coating. It is possible to perform gray tint printing of variable layer thickness, for example with a layer thickness between 1 µm and 8 µm, as well as screen printing, for achieving the stepped brightness of the illuminated image.

With a repetition of the printing process, it is also possible to apply a light-scattering structure 100 so that it has areas of stepped different layer thickness. In this case, a predetermined number of light-scattering centers 28 per area of surface can be arranged, wherein the light-scattering centers 28 can be distributed on the optical waveguide in accordance with a predetermined density distribution.

For creating a colored reproduction on the glass substrate 104, it is necessary during multi-colored printing, in accordance with four-color printing, to perform a printing process with each of the four customarily available toner colors.

With the above described CTG method it is possible to deposit, besides ceramic layers, also polymer layers, for example made of thermosetting polymer, as the toner, to glass or polymer substrates. For producing the light-scattering structures 100, transparent toners for the direct outcoupling of light, or colored toners for affecting the color location, can be employed. For example, these can be transparent or colored polymers without or with white or colored scattering particles, having proportion in volume so that it is possible to preset the color density of the final layer.

The CGT method is optimized with respect to the requirements of surface coating of insulators, wherein treatment of the glass substrate 104 can be performed in a previous method step which improves the toner transfer from the transfer drum 116 to the glass substrate.

It is also possible to employ conductive substrates in place of the glass substrate 104 represented in FIG. 5, for improving the toner transfer. The same as the glass substrate 104 with the electrode layer 105, the surface of the component can then easily be uniformly set to the desired potential by the applied voltage. An example of such substrates is glass which already has a thin transparent tin oxide layer. Thus such glass has a certain amount of conductivity.

It is also possible with the CGT method to achieve coatings with multiple structures in a simple and throughput-optimized manner by arranging several CGT devices one behind the other in the production process.

The transfer from the transfer roller to the substrate can also occur with a hot transfer method. In the process, the substrate is preheated to temperatures between 100 and 200° C., typically between 120 and 150° C. During this the toner melts upon contact with the hot substrate and in the end solidifies on the cooling substrate. In this case additional fixing can be omitted.

Figure 6:
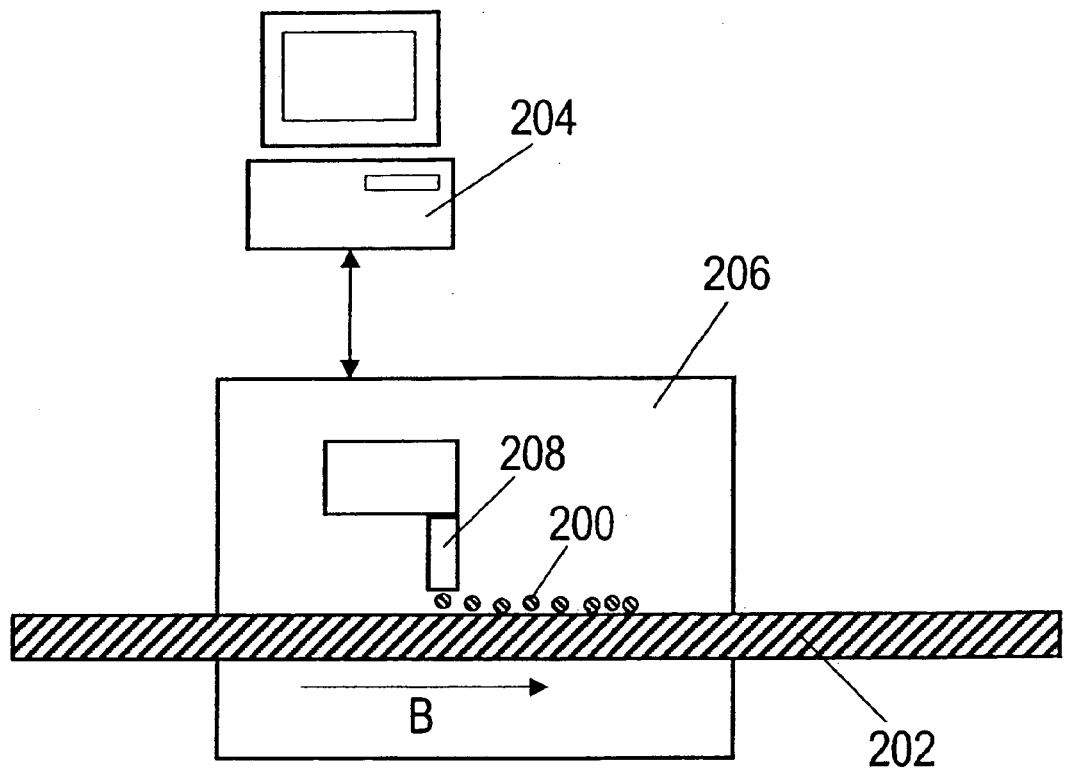
FIG. 6 shows a device operating in accordance with the ink jet method in a schematic plan view, in section, for applying light-scattering structures to the surface of flat optical waveguides.

A further embodiment of a device for applying a light-scattering structure 200 on a glass plate 202 conducted in the direction of the arrow B is schematically shown in FIG. 6. The device also contains a computing device 204. The computing device 204 controls a printing device 206 with a print head 208. An ink jet print head can be used as the print head 208, which is filled with a suitable lacquer as the coating material.

It is thus possible to transfer the desired pattern in the form of a light-scattering structure 200 directly to the glass plate 202 with the computing device 204 and the printing device 206 connected with it.

In accordance with a further embodiment, light-scattering structures can be applied with an air brush method, wherein the coating materials are sprayed onto the substrate from fine nozzles.

Objects made in accordance with the method of this invention are illuminated signs in typically small numbers, such as large-surface OLEDs or ELEDs, scattering disks for backlights of cell phones, PDAs or generally LCDs in connection with display technology, information and illuminated signs in connection with advertising or as signals, switch and sensor illumination, illuminated floors and other special illumination for use in the household, illuminated surfaces, information and illuminated signs, switch and sensor illumination in the automotive field and avionics, emergency lighting and portable lights. Also, applications in all areas of electronics, optics and opto-electronics are conceivable.

German Patent Reference 103 36 352.1, the priority document corresponding to this invention, and its teachings are incorporated, by reference, into this specification.

What is claimed is:

1. A method for producing light-scattering structures (20, 21, 100, 200) on flat optical waveguides (10, 30, 104, 202) into which light can be coupled for making the light-scattering structures (20, 21, 100, 200) visible, wherein the light-scattering structures (20, 21, 100, 200) are applied to a surface (18, 19) of the optical waveguide (10, 30, 104, 202) in a predetermined arrangement, the method including:
   applying the light-scattering structures (20, 21, 100, 200) directly to the optical waveguides (10, 30, 104, 202) in a non-impact manner, and application of the light-scattering structures (20, 21, 100, 200) occurring by imprinting with a computer-controlled, contactless-operating print head (208).

2. The method in accordance with claim 1, wherein application of the light-scattering structures (20, 21, 100, 200) includes an application of a fluid coating material which sets after being applied.

3. The method in accordance with claim 2, wherein one of a hardenable lacquer, a thermoplastic, a thermosetting plastic material, and a glass paste is selected as the fluid coating material.

4. The method in accordance with claim 1, wherein application of the light-scattering structures (20, 21, 100, 200) includes an application of a toner as a coating material which is fixed after being applied.

5. The method in accordance with claim 4, wherein one of a glass paste, glass paste particles, a thermoplastic, a thermosetting polymer, and a plastic material is selected as the toner.

6. The method in accordance with claim 5, wherein a material is selected as the coating material which is one of transparent and colored in a hardened state, and has a first refractive index approximately identical to a second refractive index of the optical waveguide (10, 30, 104, 202).

7. The method in accordance with claim 6, wherein one of a glass, a transparent plastic and a plastic material is selected as a substrate for the light-scattering structures (20, 21, 100, 200).

8. The method in accordance with claim 7, wherein one of colorless and colored light-scattering centers (28) are added to the coating material that have a refractive index different from the refractive index of the hardened coating material.

9. The method in accordance with claim 8, wherein one of color pigments and scattering particles made of one of a glass and a plastic material are selected for the light-scattering centers.

10. The method in accordance with claim 9, wherein a predetermined number of the light-scattering centers (28) per unit of surface is arranged, wherein the light-scattering centers (28) are distributed on the optical waveguide (10, 30, 104, 202) according to a predetermined density distribution.

11. The method in accordance with claim 10, wherein a material containing the light-scattering centers (28) is selected for the toner.

12. The method in accordance with claim 11, wherein a matrix (26) for receiving the light-scattering centers (28) is formed from the hardened coating material.

13. The method in accordance with claim 12, wherein application of the light-scattering structures (20, 21, 100, 200) is by application of a layer using electro-photographic coating.

14. The method in accordance with claim 13, wherein application of the light-scattering structures (20, 21, 100, 200) is by application of a conductive electrode layer (105) on the optical waveguide substrate (104).

15. The method in accordance with claim 13, wherein the optical waveguide substrate (104) has a conductive electrode layer (105).

16. The method in accordance with claim 15, wherein the conductive electrode layer (105) has one of a tin oxide layer, an indium-doped tin oxide layer (ITO) and a conductive layer.

17. The method in accordance with claim 16, wherein application of the light-scattering structures (20, 21, 100, 200) includes applying the coating material in one method step and applying the light-scattering centers (28) in a subsequent method step.

18. The method in accordance with claim 17, wherein application of the light-scattering centers (28) is controlled by a computer according to a predetermined distribution.

19. The method in accordance with claim 2, wherein a material is selected as the coating material which is one of transparent and colored in a hardened state, and has a first refractive index approximately identical to a second refractive index of the optical waveguide (10, 30, 104, 202).

20. The method in accordance with claim 1, wherein one of a glass, a transparent plastic and a plastic material is selected as a substrate for the light-scattering structures (20, 21, 100, 200).

21. The method in accordance with claim 2, wherein one of colorless and colored light-scattering centers (28) are added to the coating material that have a refractive index different from the refractive index of the hardened coating material.

22. The method in accordance with claim 21, wherein one of color pigments and scattering particles made of one of a glass and a plastic material are selected for the light-scattering centers.

23. The method in accordance with claim 8, wherein a predetermined number of the light-scattering centers (28) per unit of surface is arranged, wherein the light-scattering centers (28) are distributed on the optical waveguide (10, 30, 104, 202) according to a predetermined density distribution.

24. The method in accordance with claim 8, wherein a material containing the light-scattering centers (28) is selected for a toner.

25. The method in accordance with claim 8, wherein a matrix (26) for receiving the light-scattering centers (28) is formed from the hardened coating material.

26. A method for producing light-scattering structures (20,21, 100, 200) on flat optical waveguides (10, 30, 104, 202) into which light can be coupled for making the light-scattering structures (20, 21, 100, 200) visible, wherein the light-scattering structures (20, 21, 100, 200) are applied to a surface (18, 19) of the optical waveguide (10, 30, 104, 202) in a predetermined arrangement, the method including:
applying the light-scattering structures (20,21, 100, 200) directly to the optical waveguides (10, 30, 104, 202) in a non-impact manner, and application of the light-scattering structures (20, 21, 100, 200) being by application of a layer using electro-photographic coating.

27. The method in accordance with claim 1, wherein application of the light-scattering structures (20, 21, 100, 200) is by application of a conductive electrode layer (105) on an optical waveguide substrate (104).

28. The method in accordance with claim 1, wherein an optical waveguide substrate (104) has a conductive electrode layer (105).

29. The method in accordance with claim 14, wherein the conductive electrode layer (105) has one of a tin oxide layer, an indium-doped tin oxide layer (ITO) and a conductive layer.

30. A method for producing light-scattering structures (20, 21, 100, 200) on flat optical waveguides (10, 30, 104, 202) into which light can be coupled for making the light-scattering structures (20, 21, 100, 200) visible, wherein the light-scattering structures (20, 21, 100, 200) are applied to a surface (18, 19) of the optical waveguide (10, 30, 104, 202) in a predetermined arrangement, the method including:
applying the light-scattering structures (20, 21, 100, 200) directly to the optical waveguides (10, 30, 104, 202) in a non-impact manner, application of the light-scattering structures (20, 21, 100, 200) including an application of a toner as a coating material which is fixed after being applied, one of a glass paste, glass paste particles, a thermoplastic, a thermosetting polymer, and a plastic material selected as the toner, a material selected as the coating material which is one of transparent and colored in a hardened state, and has a refractive index approximately identical to a second refractive index of the optical waveguide (10, 30, 104, 202), one of a glass, a transparent plastic and a plastic material selected for a substrate, one of colorless and colored light-scattering centers (28) added to the coating material that have a refractive index different from the refractive index of the hardened coating material, one of color pigments and scattering particles made of one of a glass and a plastic material selected for the light-scattering centers, and application of the light-scattering structures (20,21, 100,200) includes applying the coating material in one method step and applying the light-scattering centers (28) in a subsequent method step.

31. The method in accordance with claim 9, wherein application of the light-scattering centers (28) is controlled by a computer according to a predetermined distribution.

32. The method in accordance with claim 30 wherein application of the light-scattering structures (20,21, 100, 200) occurs by imprinting with a computer-controlled, contactless-operating print head (208).

* * * * *